US008824567B2

(12) United States Patent
Vadapalli et al.

(10) Patent No.: US 8,824,567 B2
(45) Date of Patent: Sep. 2, 2014

(54) METHOD AND DEVICE FOR TRACKING ERROR PROPAGATION AND REFRESHING A VIDEO STREAM

(75) Inventors: Sarat Chandra Vadapalli, Bangalore (IN); Sriram Sethuraman, Bangalore (IN)

(73) Assignee: Ittiam Systems (P) Ltd., Bangalore, Kamataka (IN)

( * ) Notice: Subject to any disclaimer, the term of this patent is extended or adjusted under 35 U.S.C. 154(b) by 1775 days.

(21) Appl. No.: 11/696,196

(22) Filed: Apr. 4, 2007

(65) Prior Publication Data

US 2008/0247469 A1 Oct. 9, 2008

(51) Int. Cl.
- *H04N 7/12* (2006.01)
- *H04N 7/50* (2006.01)
- *H04N 7/26* (2006.01)

(52) U.S. Cl.
CPC ... *H04N 19/00187* (2013.01); *H04N 19/00781* (2013.01); *H04N 19/00278* (2013.01); *H04N 19/00987* (2013.01); *H04N 19/0003* (2013.01); *H04N 19/00933* (2013.01); *H04N 19/00363* (2013.01)
USPC ................. 375/240.27; 375/240.13

(58) Field of Classification Search
CPC ............ H04N 7/26031; H04N 7/5086; H04N 19/0003
USPC .................................... 375/240.27
See application file for complete search history.

(56) References Cited

U.S. PATENT DOCUMENTS

2002/0172283 A1* 11/2002 Kawakatsu et al. ...... 375/240.13
2003/0227972 A1* 12/2003 Fukuda .................... 375/240.13

(Continued)

OTHER PUBLICATIONS

Wang et al., "Error-Robust Inter/Intra Macroblock Mode Selection Using Isolated Regions," 2003.*

(Continued)

*Primary Examiner* — Taghi Arani
*Assistant Examiner* — Thaddeus Plecha
(74) *Attorney, Agent, or Firm* — Prakash Nama; Global IP Services, PLLC

(57) ABSTRACT

A method and device for tracking error propagation and refreshing a video stream is provided. The proposed subject matter comprises of an error propagation tracking method that works in the sub-sampled domain to reduce computational cycles and memory bandwidth. Further, the tracking based update of the error propagation metric is done differently for static and non-static regions to avoid unnecessary refresh of static areas. Through suitable thresholding of the metric at a macroblock (MB) level, a set of refresh MBs are selected for each frame. These refresh MBs are coded either as an intra MB or as an inter MB that is predicted from one or more reliable reference frames (—frames that are known to be available at the decoder with negligible errors—). Such inter coding of refresh MBs improves the compression efficiency when compared to pure intra coding of refresh MBs. Further, variants to the threshold selection are presented that result in temporally uniform distribution of the number of refresh MBs and a strict refresh scheme wherein all MBs are guaranteed to be with negligible errors following a packet loss within a committed refresh period. In addition, to using the error propagation metric, spatial connectivity to already chosen refresh MBs is used in the selection of additional refresh MBs within a frame and across frames; this reduces the rate of error propagation due to part of a macroblock predicting from older, erroneous neighboring MBs and in turn requiring more refresh MBs on the average per frame.

21 Claims, 6 Drawing Sheets

(56) References Cited

U.S. PATENT DOCUMENTS

| | | | |
|---|---|---|---|
| 2003/0235249 A1* | 12/2003 | Zhao et al. | 375/240.13 |
| 2005/0207499 A1* | 9/2005 | Hwang et al. | 375/240.16 |
| 2006/0056519 A1* | 3/2006 | Horowitz et al. | 375/240.27 |
| 2006/0176956 A1* | 8/2006 | Ducloux et al. | 375/240.13 |
| 2007/0025621 A1* | 2/2007 | Lee et al. | 382/232 |
| 2007/0030894 A1* | 2/2007 | Tian et al. | 375/240.02 |
| 2007/0110154 A1* | 5/2007 | Wang et al. | 375/240.12 |
| 2008/0232478 A1* | 9/2008 | Teng et al. | 375/240.27 |

OTHER PUBLICATIONS

Frimout et al., "Trick mode solutions for MPEG tape recording", 1994, SPIE vol. 2308, pp. 311-321.*

Vadapalli et al., "Efficient Alternative to Intra Refresh Using Reliable Reference Frames", 2007, pp. 124-127.*

* cited by examiner

METHOD AND DEVICE FOR TRACKING ERROR PROPAGATION AND REFRESHING A VIDEO STREAM

FIELD OF INVENTION

The invention relates to encoding of video streams, more particularly, it relates to a method and device for tracking error propagation and refreshing a video stream.

BACKGROUND

A video stream generally includes a number of image frames. For communicating video streams over Internet or wireless networks the video streams are typically encoded according to predictive video coders. A predictive video coder encodes the video stream using motion compensation. Video Communication over the Internet or wireless networks may be prone to User Datagram Packet (UDP) losses. The video stream, which is encoded according to a typical predictive video coder, may be subjected to substantial quality degradation because of an error caused, due to packet loss, in a particular image frame. This may be because the error occurring in an image frame may propagate through the motion compensated prediction loop and/or may corrupt image frames that might have been received correctly. Thus, good video quality of service (QoS) over these networks requires error resilience mechanisms.

Periodic intra frame coding is one mechanism that provides some degree of error resilience while communicating the video stream over these networks. According to this mechanism the video stream may be encoded to include an intra-image frame (I-frames) followed by a number of predicted image frames (P-frames). The P-frames are image frames that may be predicated according to motion compensation, whereas I-frames are image frames that may be included with the encoded video stream and/or these frames may not have any dependency over preceding image frame/s. This mechanism breaks the prediction dependency chain and/or stops error propagation through the video stream. However, Intra-coding requires more bits and may reduce the coding efficiency. Also, it may not address situations when the I-frame itself has the error due to the packet loss, which is made more likely because of the higher percentage of bits consumed by I-frames.

In low latency-video communication systems, periodic intra-frame coding may be difficult as it results in a higher end-to-end latency, jerky video and/or loss of lip sync. Progressive intra refresh is a mechanism that may be used for such systems, wherein, each of the image frames is considered to include a number of macroblocks (MBs). Amongst these MBs, selected MBs in the image frame are encoded as intra MBs (i.e. without any dependency over preceding image frame/s). Encoding an error free MB or image frame in the video stream is also referred to as refreshing. Selection of macroblocks (MB) in the image frame needs to be done such that, within any given number of consecutive image frames, all MB positions are nearly free of errors propagating from a loss happening at the start of such period. The refresh period is a period of time over which the error propagation at the decoding end is reduced to an identified level from the time of occurrence of the error, provided that no other errors get introduced during this period.

While there are several intra refresh methods in the literature such as random refresh, motion-adaptive refresh etc., the following problems of intra refresh may not have been addressed till now: compression efficiency loss due to intra refresh; implementation complexity in terms of processing cycles and memory requirements, specifically, in methods using motion adaptive refresh; higher end-to-end latency and image frame skipping in the course of video communication because of a non-uniform distribution of refresh MBs and/or a high number of refresh MBs in a given picture; rapid error propagation due to prediction of an MB from one or more MBs that are relatively older due to lack of spatial relationship amongst the refresh MBs within a frame and larger deviations from a committed intra refresh period.

SUMMARY OF THE INVENTION

To this end, the present subject matter comprises of the following:

A method to initialize, update, and reset an error propagation metric differently for static and non-static regions with an aim to minimize refresh of static areas which may result in reduced error propagation once the initial coded version of the static area is received with reduced errors at the decoding end. The metric may eventually used to select the set of refresh MBs within a frame. The metric may be a pixel dependency count which gets incremented for every time an MB is coded as an inter MB or a probabilistic distortion estimate of an MB given the probability of packet loss.

A method of performing the tracking of the metric according to the motion attributes of the coded MBs in a sub-sampled representation so as to lower the memory bandwidth and computational complexity of the tracking. Specifically, the metric is maintained only at lower resolution (compared to the resolution of the image frame) and the motion compensated propagation of the metric is done at this lower resolution.

A method of refreshing the MB by coding the MB as an inter MB with respect to a reliable reference frame (RRF) (a frame known to be available with negligible errors at the decoding end) with the view to improving the coding efficiency of the refresh method compared to coding refresh MBs as intra MBs. The selection of the MBs to refresh is based on the error propagation metrics evaluated over those MBs. The decision to code a refresh MB as an inter MB (with respect to an RRF) or an intra MB is done by evaluating a suitable cost function for each mode and choosing the mode with the lower cost.

A method for achieving guaranteed strict refresh within a committed refresh period by employing a conservative threshold on the error propagation metric evaluated over each MB when selecting the set of refresh MBs in each frame.

A method for spatially growing one or more refresh regions to reduce the rate of error propagation (when using the pixel dependency count) due to newly refreshed MBs partially predicting from neighboring MBs that were not refreshed recently. By constraining a region to be refreshed as a whole, the error propagation from within the region to an older dependency count is reduced, which in turn reduces the rate of refresh MBs per frame.

A method of threshold selection on the error propagation metric, while selecting the refresh MBs, that refreshes certain MBs ahead of their time with a view to avoiding to keeping the percentage of refresh MBs as uniform as possible over time and in effect, keeping the end-to-end latency low.

In addition to these specific methods, the subject matter also presents a method of incorporating all these methods in tandem as a method of refreshing a video stream in the presence of channel errors to achieve a combination of the above objectives.

The present subject matter can be realized in hardware through incorporation of the methods as logic gates or can be realized in software through encoding of the methods as instructions that get executed on a processor.

BRIEF DESCRIPTION OF FIGURES

The subject matter is explained in greater detail below and is depicted in the drawing, in which.

DETAILED DESCRIPTION OF SUBJECT MATTER

In the following detailed description of various embodiments of the subject matter, reference is made to the accompanying drawings that form a part hereof, and in which are shown, by way of illustration, specific embodiments in which the subject matter may be practiced, these embodiments are described in sufficient detail to enable those skilled in the art to practice the subject matter, and it is to be understood that other embodiments may be utilized and that changes may be made without departing from the scope of the present subject matter. The following detailed description is therefore, not to be taken in a limiting sense, and the scope of the present subject matter is defined only by the appended claims.

For the purpose of this discussion, following definitions are used. A video stream includes a number of image frames. Each of the image frames has a number of pixels. In an image frame a pixel or a group of pixels may be identified as a region or a block. A rectangular block of pixels may be identified as a macroblock (MB). A group of regions or a group of blocks may be identified as an MB. An MB may have a single block or single region. Further, a block or a region or an MB may or may not have a geometrical shape. The MB may include rectangular blocks of pixels. The MB may be a unit according to which the coding decisions may be made. The MBs in an image frame may be coded either as an intra MB (I-MB) or as inter MB (P-MB).

Figure 1:
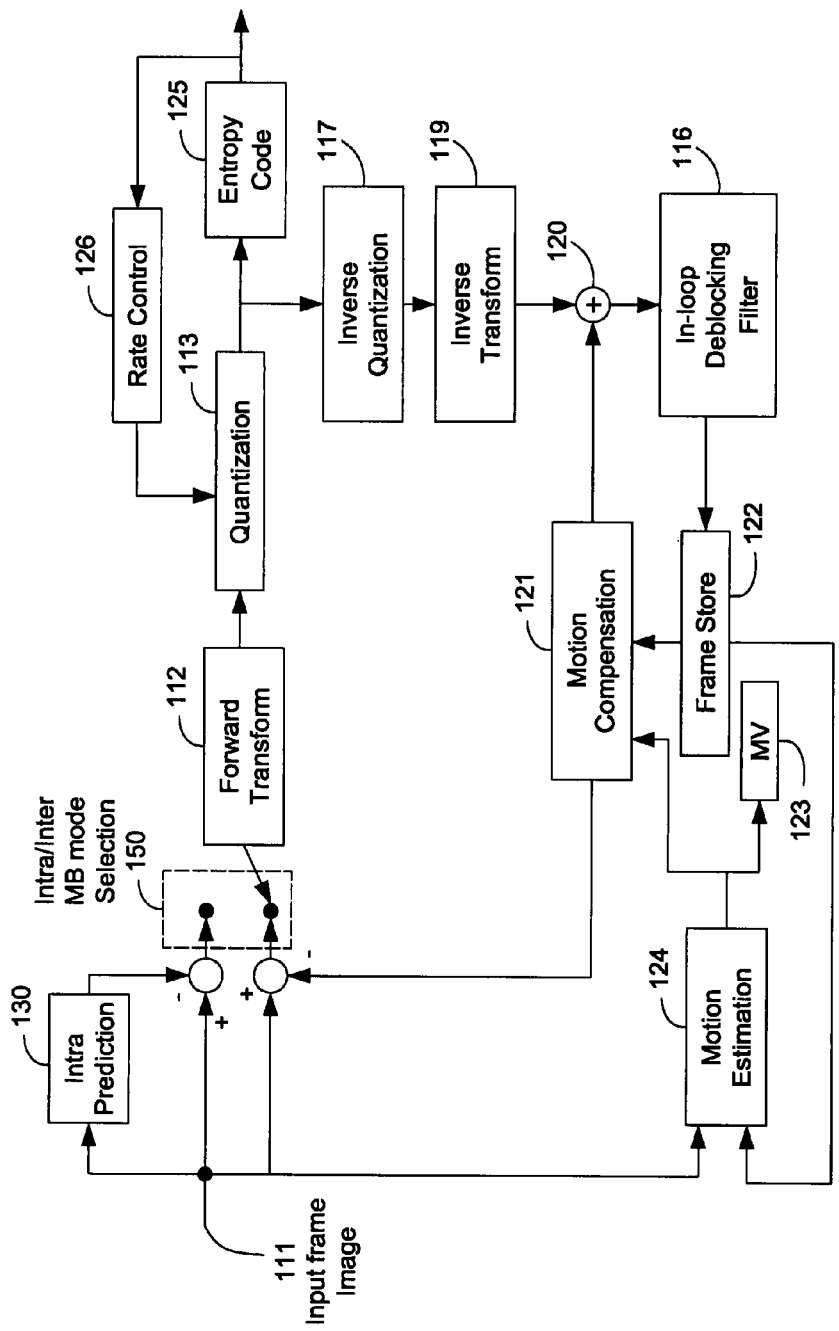
FIG. 1 shows a block diagram of one of the possible embodiments of a typical video encoder in accordance with the present subject matter and steps followed therein.

FIG. 1 shows a typical video encoder in the context of the subject matter. Input image frames arrive at 111, and are processed at intra prediction block 130, motion estimation block 124, motion compensation block 121, forward transform at block 112, quantization at block 113, inverse quantization at block 117, and inverse transform at block 119. An adder at block 120 receives signals from blocks 119 and 121 and sends an output to the frame store at 122 via an in-loop deblocking filter 116. The motion vector block at 123 provides a motion vector. Entropy code block 125 provides the output of the encoder. A feedback is provided to the quantization block 113 via rate control block 126. Additional details about the operation of individual blocks should be intelligible to those skilled in the art. The subject matter resides in the block 150, where the intra vs. inter MB coding mode selection is done. For the purpose of this discussion, an MB is a refresh MB if it is coded either as an intra MB or if it is coded as an inter MB from a reference frame which is known to be available at the decoder with negligible error.

This discussion provides a method for error tracking and refreshing image frames/MBs of a video stream. In the proposed method, a value of a metric indicative of the probability of error occurrence is computed and tracked across image frames. The value of the metric may be indicative of level of error propagation in a block/MB. The information obtained from the tracking of such errors may be used for selecting a set of MBs for refreshing a given image frame. The value of the metric may be computed and tracked for each pixel of an image frame or may be for a group of pixels in the image frame. Computation and/or tracking of the value of the metric for the group of pixels are referred to as sub-sampled domain operations. Implementation complexity and/or memory requirements may be reduced while computing and tracking of the value of the metric is performed in a sub-sampled domain.

To reduce the complexity of error tracking in terms of memory bandwidth, the method adopts tracking in the sub-sampled domain. When error tracking is implemented in the sub-sampled domain, a metric is assigned to each block and the tracking of the values of the metric is done for each of these blocks. The value of metric for the block may be a function of the values of the metric of the pixels included in the block. The value of the metric for a block may be the average value of the metrics of pixels, or may be the value of metric of the pixel with highest error propagation in the block, or the metric may be a value that may be obtained by any other function of the metric values of the pixels included in the block. Once the metric for the block is obtained, all the subsequent operations—like updating, resetting etc, (explained later)—may be performed on the obtained metric. It should be noted that the above definition of the metric of the block as a function of the values of the metrics of the pixels included in the block would not require implementation of tracking of the metrics for each of the pixels. The method of tracking values of metrics of blocks in the image frames reduces complexities compared to tracking metrics for each pixel. The method of tracking the metric values of blocks is described in detail later.

For the purpose of implementing the refresh scheme, primarily the step of choosing the set of the MBs to be refreshed in the image frame, the metric indicative of the probability of error propagation in an MB is defined. A metric for an MB—which is referred as an MB level metric—may be derived from the metrics of the blocks included in the MB The derivation of MB level metric may include obtaining of a metric that is an average value of the metrics of pixels/blocks included in the MBs, or may include obtaining of the metric that indicates relatively highest error propagation in the pixel/block included in the MB, or the metric may be the value that may be obtained by any other function of the metric values of the pixels/blocks included in the MB.

Further, while considering following discussion for a group of MBs an appropriate substitution of word 'metric' with the word 'group level metric' should be made. A group level metric for the group of MBs may be obtained according to values of the MB level metrics of the MBs included in the group of MB. According to one possibility, a group level metric value may be a value of the MB level metric of an MB included in the group that indicates substantially highest error propagation. According to another possibility, the group level metric may be a value that is an average of the values of the MB level metric of the MBs included in the group of MBs. The group level metric may be the value that may be obtained by any ether function of the MB level metric of the MBs included in the group of MBs.

The present subject matter provides the method that may offer nearly uniform distribution of refreshed MBs across image frames by selectively refreshing MBs according to respective metrics. The rate of error propagation may be controlled by identifying MBs having higher metric, and/or refreshing identified MBs along with MBs that are spatially connected to the identified MBs, irrespective of their metrics. The proposed method also lends itself to allow for a strict refresh within a specified intra refresh period. In addition, the proposed method allows a slower refresh of static areas which are less susceptible to errors and has the ability to tailor the refreshing scheme according to perceived visual significance of an MB. A method that integrates these and other solutions is presented. Further, the compression efficiency loss due to refresh may be reduced by coding the refresh MBs using a loss-free reference frame available at the decoder.

The method provides tracking of probability of error propagation by performing motion compensation of the values of the metrics in a reference frame according to the motion vector used to code the pixel or group of pixels. The metric is indicative of the probability of error in the pixel or group of pixels. According to a definition of the metric, the metric is a count value and may represent the number of image frames over which the value of the pixel or group of pixels depends in the coded video stream. According to an alternative definition of the metric, the metric may be a probabilistic estimate of distortion due to channel losses. The value of the metric may be a cumulative function of dependencies of the pixel/block over pixels/blocks in the preceding image frames. Dependency is a degree of reliance of the pixel/block over pixels/blocks in the preceding image frame for assuming its value. For a block, the value of the metric of the block is the vector composed of the values of the metrics of the pixels included in the block. A block may depend on one or more blocks in the preceding image frames. For the first image frame the degree of reliance is nil and the blocks of the first image frame may have no error propagation.

Figure 2:
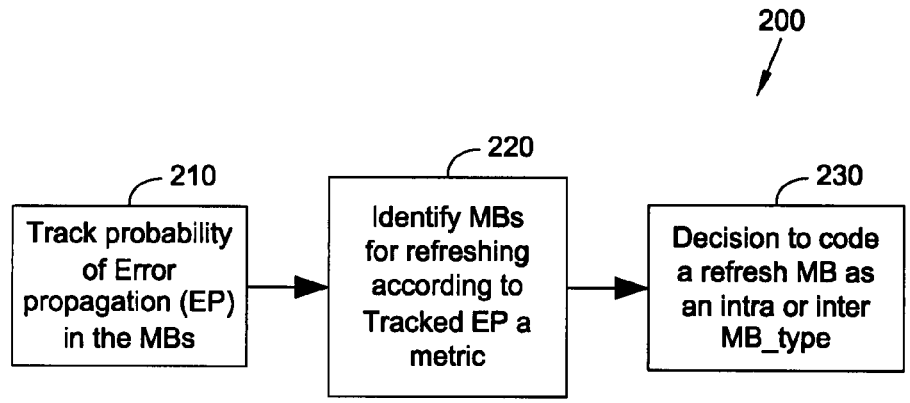
FIG. 2 shows a block diagram of one of the possible embodiments of a method in accordance with the present subject matter and steps followed therein.

FIG. 2 shows a block diagram 200 of one of the possible embodiments of a method in accordance with the present subject matter and steps followed therein. According to this embodiment at the first step 210, a probability of error propagation is tracked in the image frame of the video stream. The image frame includes a number of MBs. The tracking may be performed for each of the MBs. At a step 220, the method provides identifying MBs according to the tracked probability of error propagation identified for refreshing. At a step 230, the method provides deciding to code an MB of the image frame according to either intra or inter coding mechanism.

Figure 3:
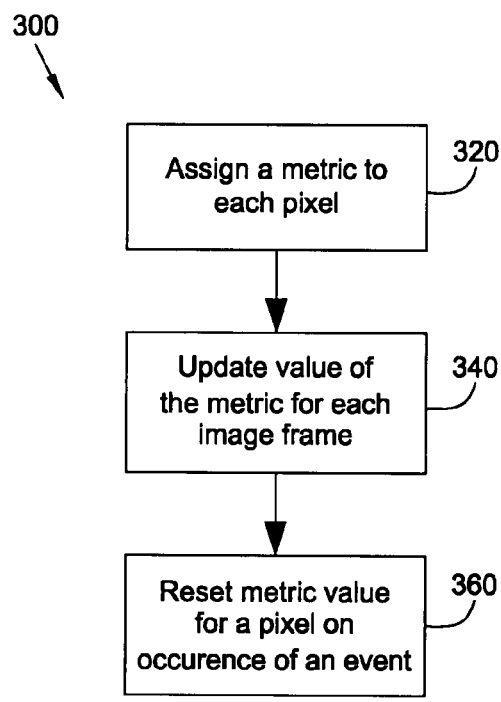
FIG. 3 shows a flow diagram of one of the possible embodiments of a method in accordance with the present subject matter and steps followed therein for tracking error propagation in a block of pixels.

FIG. 3 shows a flow diagram 300 depicting more detailed steps that may be followed for tracking error propagation 210, in the image frame. According to one aspect, the metric is assigned (at step 320) to each of the pixels of the first image frame of the video stream. For subsequent image frames, the values of the metric of the pixels are updated (340) according to an updating function. It should be noted that the step of assigning and step of updating may be carried out in the sub-sample domain. For performing these steps in the sub-sample domain the description may be read by replacing work pixel by word block/MB, more details of operations in sub-sample domain will be discussed later.

The updating function is configured to estimate dependency of the pixel over preceding image frames, according to the degree of dependency. The step of updating (340) the metric (say, PDC) may be based on the principle described below:

If a pixel p(x,y,n) with co-ordinates (x,y) in an image frame 'n' belongs to:
1. An inter-coded region and the motion vector (MV) of the block/MB containing the pixel is (mvx, mvy), then $$DC(x,y,n)=PDC(x+mvx,y+mvy,n\_ref)+Iref \quad (1);$$

2. An intra-coded region, then $$PDC(x,y,n)=0 \quad (2).$$

Where n_ref is the index of the image frame used by the coder for predicting the value of p(x,y,n); Iref is the increment value derived based on 'n' and 'n_ref'. According to one aspect of the subject matter the Iref may be computed as Iref=n−n_ref.

When applying the method of tracking PDCs to a H.264 based coder, it has been assumed that constrained Intra Prediction is used and the effect of in-loop de-blocking filter (block 116) has been ignored. With these assumptions, the effect of spatial propagation of error within the image frame can be ignored. When the block/MB in the image frame goes through sub-pixel motion compensation, the error in values of any of the pixels used for interpolation can lead to an error in the final reconstructed value. In this case, the PDC values are updated as:

1. $PDC(x,y,n)=1+\max\{PDC(xi,yi,(n-1))|\forall(x_i,y_i)\in S(x,y)\}$ \quad (3):

Where S(x,y) is the set of pixels in (n−1)th image frame used for interpolation of a predictor of pixel p(x,y,n).

The updating function of (1) may include a decrementing step. The PDC value may be decremented to include knowledge of reception of one or more frames with a minimal propagated error.

When the decrementing function is applied to the specific updating step in (3) and when an identified frame (with a frame index n_id) is known to have been received with minimal propagated error, the updating step would be modified as 1. $PDC(x,y,n)=+1+\max\{PDC(xi,yi,(n-1))|\forall(x_i,y_i)\in S(x,y)\}$ 2. If $PDC(x,y,n)>(n-n\_id)$.

Then set $PDC(x,y,n)=PDC(x,y,n)-(n-n\_id)$ \quad (4)

With the definition of PDC (metric) as explained above, ensuring refresh of a pre-determined number of frames (say R), is equivalent to bounding the value of PDC to R.

While tracking the metric in the sub-sampled domain, a PDC value may be maintained for every (K×K) block of pixels, where K is the sub-sampling factor. The PDC value maintained for a (K×K) block is a function of the PDC values of the pixels lying in that block. The process of updating the PDC in sub-sampled domain is equivalent to up-sampling the sub-sampled PDC of reference image frame followed by PDC tracking and down-sampling the updated values using a maximum operator. In an implementation, the PDC values of the pixels are not tracked and the updation is carried out by tracking the dependency of the block over one or more blocks in the preceding image frames. This reduces the computational and memory bandwidth complexities.

The metric tracked may be a probabilistic estimate of the distortion occurring in pixel values due to loss of one or more image frames in the coded video stream. The update function may be configured to update the value of the metric to indicate an estimate of a distortion of the block. The distortion may occur due to loss of one or more image frames. Given that the receiver of the lossy coded video stream uses a particular error concealment scheme and the encoder simulates the behavior of the error concealment scheme, one of the possible formulae to obtain the estimate of distortion for a set of substantially consecutive image frames n+2, n+1, n having related pixels xn+2, xn+1 and xn and each pixel having a pixel value pn+2, pn+1 and pn, the distortion estimate Dn for the block in nth image frame may be given as follows:

$$Dep(n,m)=(1-w)*Dep\_ref(n,m)+w*(Dec\_rec(n,m)+Dec\_ep(n,m)) \quad (5)$$

Where, Dec_rec(n, m) is the absolute value of the difference between the error-concealed value of the pixel when image frame n may be lost in the transmission and the reconstructed value of the pixel. While computing the concealed value it may be required to assume that earlier received image frames are lossless image frames:

When the pixel n belongs to an Inter-coded MB, Dep_ref (n, m) is the estimate of the distortion in the pixel(s) in the reference frame on which the value of the pixel m in the coded sequence depends, else Dep_ref(n, m)=0; otherwise Dec_ep (n, m) is the estimate of the distortion in the pixel(s) in the reference frame used for concealment on which the concealed value of pixel m in image frame n depends.

When multiple pixels from the reference frame are needed for the computation of the concealed pixel value, Dec_ep (n, m) may be computed as a function of the estimates of distortion in the pixels from the reference frame used for the concealment of pixel m in frame n. A similar function can be applied for the computation of Dep_ref (n, m). The function may implement an average or weighted average of the available estimates. It can also find the maximum of the available estimates.

While computing an estimation of distortion corresponding to the block, the step of updating may be carried out on the sub-sampled domain. For estimating distortion for a k×k block the updating function for nth image frame may be computed as follows:

When the block k belongs to an Inter-coded MB:

$$Dep(k,m)=(1-w)*Dep\_ref(k,m)+w*(Dec\_rec(k,m)+Dec\_ep(k,m)) \quad (6)$$

Where, Dec_rec(k, m) is the distortion between the error-concealed value of the pixel when image frame n may be lost in the transmission and the reconstructed value of the block. The distortion may be a Sum of Absolute Differences (SAD) or Sum of Squared Differences (SSD) between the values of the pixel in the reconstructed block and the concealed block. It may be assumed that, while computing the concealed value the previous image frames that have been received have no losses.

When the block k belongs to an Inter-coded MB:

Dep_ref(k,m) is the estimate of the distortion in the block(s) in the reference frame on which the values(s) of the pixels in block k of frame n in the coded sequence depends, else Dep_ref(k, m)=0;

Dec_ep(k,m) is the estimate of the distortion in the block(s) in the reference frame used for concealment on which the concealed value of pixels in block k of frame n depends.

When multiple blocks from the reference image frame may be needed for the concealment of the block, Dec_ep(k,m) may be computed as a function of the estimates of distortion in the blocks from the reference frame used for the concealment of block k in image frame n. A similar function can be applied for the computation of Dep_ref(k, m). The function may implement an average or weighted average of the available estimates. It can also compute the maximum of the available estimates.

The method provides a step 360 of resetting the metric. The step provides a resetting function. The resetting function resets the metric according to an event and it resets the metric to a value evaluated over a block. The resetting function may reset the metric according to the refresh status of the pixel/block, i.e., the value of the metric of the pixel/block is reset whenever the pixel/block in the image frame belongs to the MB which may be refreshed. The resetting function resets the metric to the value to indicate a known level of error propagation in the pixel/block. The known level may be a level that indicates no error propagation in the pixel. According to one example, when the metric being tracked is a count value, for a refreshed pixel the resetting function may reset the metric as PDC(x, y, n)=0. According to one example, when the metric being tracked is an estimate of the distortion in the block, for the block belonging to a refreshed MB the resetting function may set the metric using a resetting function as:

$$Dep(k,m)=w*(Dec\_rec(k,m)+Dec\_ep(k,m)) \quad (7)$$

The equation 7 is equivalent to setting Dep_ref(k, m)=0 in equation (6).

The method provides updating 340 the metric according to the updating function for each pixel of the image frame and for each image frame of the video stream, and following the updating step 340 with the resetting step 360 according to the resetting function on occurrence of the event. Similar to the step of updating the method of resetting may also be performed in the sub-sampled domain. Further it should be noted that, it is not necessary for the purpose of the subject matter that the event should correspond to the pixel only, the event may correspond to a group of pixels or a block.

The above described method of tracking may also be used in conjunction with the method of tracking the dependency counts described earlier. In such an implementation both the information of the inter-frame dependencies and the information of the estimated error values in each of the blocks would be available for use by the scheme of selection of macroblocks for refresh.

In the above described method of tracking, when the metric tracked is the count value, the metric of the pixel/block is indicative of the probability of error in the pixel/block in the image frame. This metric does not give preferential treatment to areas based on the extent of motion or the possible amount of distortion in various parts of the image frame. Personals skilled will know that when the metric is a distortion estimate, this lacuna is not there. Static areas are areas of the video frame that do not see any significant change across frames. Typically video communication systems employ, at the least, a simple packet loss concealment scheme based on temporal replacement. In this method of concealment, the lost areas of a video frame are replaced with spatially co-located areas of the previous frame. If such a concealment algorithm is used, static areas can be almost completely recovered even after frame loss.

For achieving faster recovery from frame loss conditions, moving areas should be refreshed at a higher rate as compared to the static areas. This kind of behavior would make the refresh pattern motion adaptive. In videophone applications, a significant part of the video frame belongs to the background and with the camera mostly fixed, the background is static. In such applications, a motion adaptive refresh scheme based on static area detection would even help in reducing the number of refresh MBs. In the following discussion an embodiment of the subject matter that addresses this issue and employs static area detection to ensure an efficient video coding is discussed.

A static area of an image frame may be an area identified having substantially constant pixel value across image frames, whereas a non-static area of an image frame may be an area identified as having substantially varying pixel values across image frames.

Figure 4:
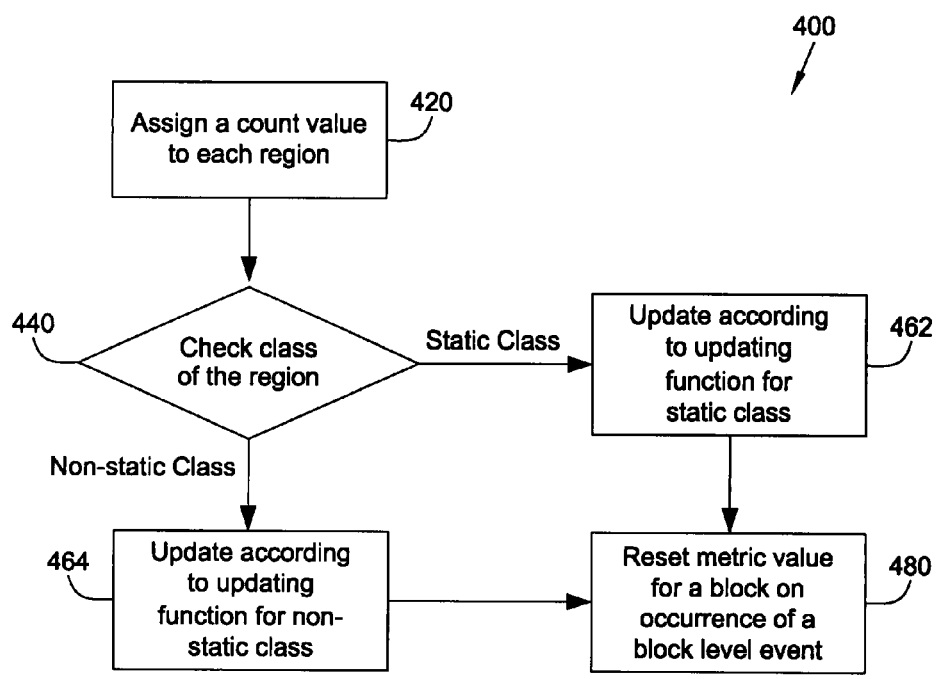
FIG. 4 shows a flow diagram of one of the possible embodiments of a method in accordance with the present subject matter and steps followed therein for tracking error propagation in a region.

FIG. 4 shows an embodiment for tracking error propagation of the step 210, in accordance with the present subject matter and steps followed therein for tracking error propagation in a region. According to this aspect of the subject matter a region is identified in the image frame. At the first image frame for each region the count value is initialized 420. According to this embodiment, the regions may be classified at least in two classes, namely static region and a non static region. For this embodiment, an updating function and a resetting function as described earlier may be provided for each class of regions, with an appropriate substitution of word metric with a word count and the word block with a word region. The updating function for static region may have a different characteristic in terms of updating the value of the count as compared to the updating function for non-static region. For example the value of a count for a static region may change at different rate as compared to the value of a count in a non static region per image frame. However, the resetting function may reset the value of a count for both the static or non static region in the same manner. The method provides a step of checking 440 wherein it is determined if the region is the static region or the non static region. Subject to the result obtained from the step 440 the count value is updated in the step 462 or 464. Following an updating step 462 or 464, a further resetting step 480 is provided. The resetting step may be provided to reset the value of the count on occurrence of a region level event.

According to one aspect the updation of metric value may be carried out as follows:

If DC(x,y,n) be the dependency count of the pixel p(x,y) with co-ordinates x, y in the image frame n then, $$DC(x,y,n) = \max\{DC(xi, yi, n\_ref)\} + I(x,y,n) \quad (8)$$

Where, n_ref is the index of the image frame used by the coder for predicting the value of p(x,y,n); max {DC(xi, yi, n_ref)} is computed over all pixels (xi, yi) in the image frame (n_ref) used to predict the value of pixel p(x, y) in frame n and I(x, y, n) is the incrementing function.

A pixel p0(x0, y0) in frame (n_ref) is said to be used for predicting the value of a pixel p(x, y) in frame n; if p0 is used for the motion compensated prediction of p. When the pixel p(x,y) in frame n belongs to an MB which has been assigned a Sub-pixel motion vector (mvx, mvy); the pixel p(x,y) would depend on more than one pixel in frame (n_ref).

The incrementing function (x, y, n) of equation (6) may be set as follows:

I(x, y, n)=Istatic; When the pixel p(x,y) has been detected to be belonging to the static area in frame n:

I(x, y, (n))=Inon-static; otherwise.

It may be understood from above that different incrementing functions are used for updating count values corresponding to static and non-static areas. This enhances the motion adaptation of the refresh scheme. According to an example when a fixed threshold based refresh scheme has been employed and the increment values in the tracking mechanism have been set as Istatic=1; and Inon-static=2, the count values of the static areas would grow at half the rate of growth of count values of non-static areas. Thus static areas would be refreshed at half the frequency of refresh of non-static areas.

In an example, when the pixel p(x,y) in frame n belongs to an MB which uses frame (n−1) as a reference frame and has been assigned a (sub) pixel motion vector (mvx, mvy)

$$DC(x,y,n) = DC(x-mvx, y-mvy, n-1) + I(x,y,n) \quad (9)$$

In this case, there is only one pixel in frame (n−1) on which the pixel p(x,y) in frame n is dependant on.

Further in another example when the tracking is being done in the sub-sampled domain, i.e. on blocks instead of pixels. If DCB (m, n) represents the dependency count of the block m in frame n and uses frame (n−1) as a reference frame; then, $$DCB(m,n) = \max\{DCB(mj,(n-1))\} + I(m,n)) \quad (10)$$

Where, the max {DCB(mj, (n−1))} is computed over all the blocks belonging to the set S(m, n−1) of blocks in frame (n−1); where the set S has the following properties: any pixel p0 of frame (n−1) used for the prediction of at least one pixel of block m in frame (n); may belong to one of the blocks in set S(m, (n−1)); B(m,(n−1)) would be the smallest set satisfying the above property.

The updating function of (8) may include a decrementing step. The PDC value may be decremented to include knowledge of reception of one or more frames with the minimal propagated error.

The decrementing step would extend the decrementing step detailed earlier and demonstrated through (4) to pixels/blocks in each of the different classes of the image frame. The decrement value may depend on the increment value used for the MBs in the class and/or would be designed such that the DC value of the pixel/block reflects the true dependency in the presence of knowledge of reception of one or more frames with the minimal propagated error.

It should be understood by a person skilled in the art that the function will reduce to a general updating function and may be applicable to the steps discussed with reference to FIG. 3 when conditions for functions-relating to static and non static areas are made identical. Further, it should be noted that the above discussion refers to classifying region into static and non-static classes as an illustration. However, the method without affecting generality may be extended to classifying regions in different manners. Such classification may include, classification based on region of interest, which may include a region having high priority as against other regions for example, face; hands; foreground; background; or any other identified area. Further the incrementing function discussed may also be defined according to the classification of the region.

As mentioned earlier with reference to FIG. 2 block 220, the tracked metric values of pixels/blocks in the image frame that may be used to choose the set of MBs to be refreshed in the image frame. As the decision to refresh happens only at the granularity of the MB, MB level metric values (defined earlier) may be used in the process of choosing the refresh MBs. The method of computation of MB level metric may be independent of the tracking mechanism used. Similarly, the method of choosing the refresh MBs is also independent of the method of mechanism used to generate the MB-level metrics used in the refresh mechanism.

The refresh mechanism primarily tries to identify MBs with the highest possible error propagation. While doing so it might apply some additional criteria to meet some desired refresh characteristics as explained earlier.

The step of resetting in any of above referred embodiments is performed according to a block level event. The event basically is a refresh event. For performing step of refreshing the block are identified according to step 220. More details of step of identifying 220, MBs is described below.

The selection of the MB for refresh may be carried out according to the priority of an MB for refresh, according to a histogram—the histogram being representative of a relation between the number of MBs having a value of metric—by limiting a number of un-refreshed MBs in the image frame, according to spatial distribution of refreshed MBs in the image frame, by limiting an allowed error propagation in an MB, according to a refresh period of the image frame, by limiting number of MB that can be refreshed in the image frame or according to any combination of above and other conditions.

For the selection of MBs for refreshing according to priority of the MBs, each of the MBs are assigned a priority, the priority may be indicative of an allowable period of time between two refresh event of the MB. Subject to the priority status of the MB, the MB is selected for refreshing.

For selection of MBs for refreshing according to the histogram, consider an example, wherein the metric is represented as integer values and error propagation in the MB is proportional to the metric and following table 1 represents a relation between number of MBs and value of the metrics in the image frame. The content of the table may be used to generate a graphical representation to provide the histogram.

TABLE 1

| No. Of Macroblocks | | | | | | | | | | | | |
|---|---|---|---|---|---|---|---|---|---|---|---|---|
| 3 | 5 | 4 | 2 | 4 | 8 | 9 | 7 | 5 | 4 | 3 | 2 | 2 |
| Value of the Metric | | | | | | | | | | | | |
| 1 | 2 | 3 | 4 | 5 | 6 | 7 | 8 | 9 | 10 | 11 | 20 | 30 |

From above Table 1, it can be observed that there are total 4 MBs having value of the metric 20 and 30. This means that the error in these MBs may be highest and they require immediate refresh. Accordingly, these 4 MBs may be selected. Further according to one selection method all the MBs having a metric higher than a threshold value of metric may be selected for refresh, for example if the value of threshold is 9 then all the 11 MBs corresponding to value of metric 10, 11, 20 and 30 are selected for refresh. According to one example, a threshold may be set for a number of MBs that can be refreshed in an image frame, for example maximum (threshold) numbers of MBs that can be refreshed in an image frame are 20 then all the MBs having value of the metric 9, 10, 20 and 30 are selected and any 4 MBs having value of the metric 8 are selected. The 4 MBs out of 7 may be randomly selected or may be selected accordingly priority or by any other selection criterion. The threshold number of MB may be decided according to the density of the histogram of value of the metric. According to another example, an additional lower threshold may be set for the value of the metric of the MB that is selected for refresh. This ensures that an MB which has minimal probability of error or minimal amount of error as measured by the tracked metric is not refreshed. According to yet another example, it may be observed from the Table 1 that maximum number of MBs have the value of the metric 6, 7 and 8, these MBs may be selected in order distribute the refresh action across image frames. The threshold values discussed above may be adaptively changed for achieving a uniform distribution of refreshed MB; across the image frames.

The above mentioned of method of selection of macroblocks according to a histogram may be extended further to use macroblock level metrics derived using more than one method of tracking error propagation. In such a case for each macroblock, a first tracking method may be used to derive a first macroblock level metric and a second tracking method may be used to derive a second macroblock level metric. The method of selecting a first set of macroblocks may be done using the first macroblock level metric and applying a threshold on the first macroblock level method. This may be done through the histogram of the first macroblock level metrics as described earlier. From the identified first set of macroblocks, a subset of macroblocks may be chosen for refresh according to the values of their second macroblock level metric.

This scheme of choosing macroblocks for refresh finds application when method of tracking dependency counts of blocks of pixels is used in conjunction with the method of tracking the distortion estimate in blocks. An initial set of candidate macroblocks may be chosen according to the first MB-level metric derived from the DC of the blocks included in the respective macroblocks. This may be done by applying a lower bound on the first MB-level metric. The final set of MBs to be refreshed may be selected from the initial set according to the MB-level metrics derived from the distortion estimate of the blocks included in the respective macroblocks. Without loss of generality, the order of use of the 2 MB-level metrics may be reversed.

Where uniform distribution of refresh MBs across image frames is not a critical criteria, the method may also lend itself to allow for a strict refresh within a specified intra refresh period. In this scheme the threshold on the value of the MB level dependency count to be used for selecting the MBs to be refreshed in the image frame is constrained to be always lower than the value corresponding to the specified intra refresh period. The steps of the strict refresh may include:

Error tracking based on dependency counts and the increment value used for the Dependency count is 1.

The MB level dependency count is derived as the maximum of the values of the dependency counts of the pixels/blocks included in the MB.

The threshold on the MB level dependency count is set to be lower than the number of image frames in the specified intra refresh period.

Any MB with dependency count greater than the threshold is selected as a refresh MB.

The probability of error propagation in static areas may be lower as compared to non-static areas. Hence, MBs in the static areas may be refreshed at a lower rate per image frame as against the non-static area. The lower refresh rate of MBs of static area may result in artifacts in MBs belonging to static areas due to packet loss. The threshold on the value of the metric can therefore be set adaptively based on the targeted rate of refresh of static and non-static areas and the ratio of static MBs in the image frame. According to one aspect the MBs may be selected to ensure a substantially uniform distribution of refreshed blocks across the image frames.

The above described method of selection of MBs from static and non-static areas is only an illustration. In an implementation, the MBs in the image frame may be classified into one or more classes. The number of MBs to be refreshed from each class of MBs would be derived from the targeted rate of refresh of MBs in the class and the number of MBs in the class. The selection of MBs from each of the classes may be done using one or more of the methods described in this document.

Figure 5:
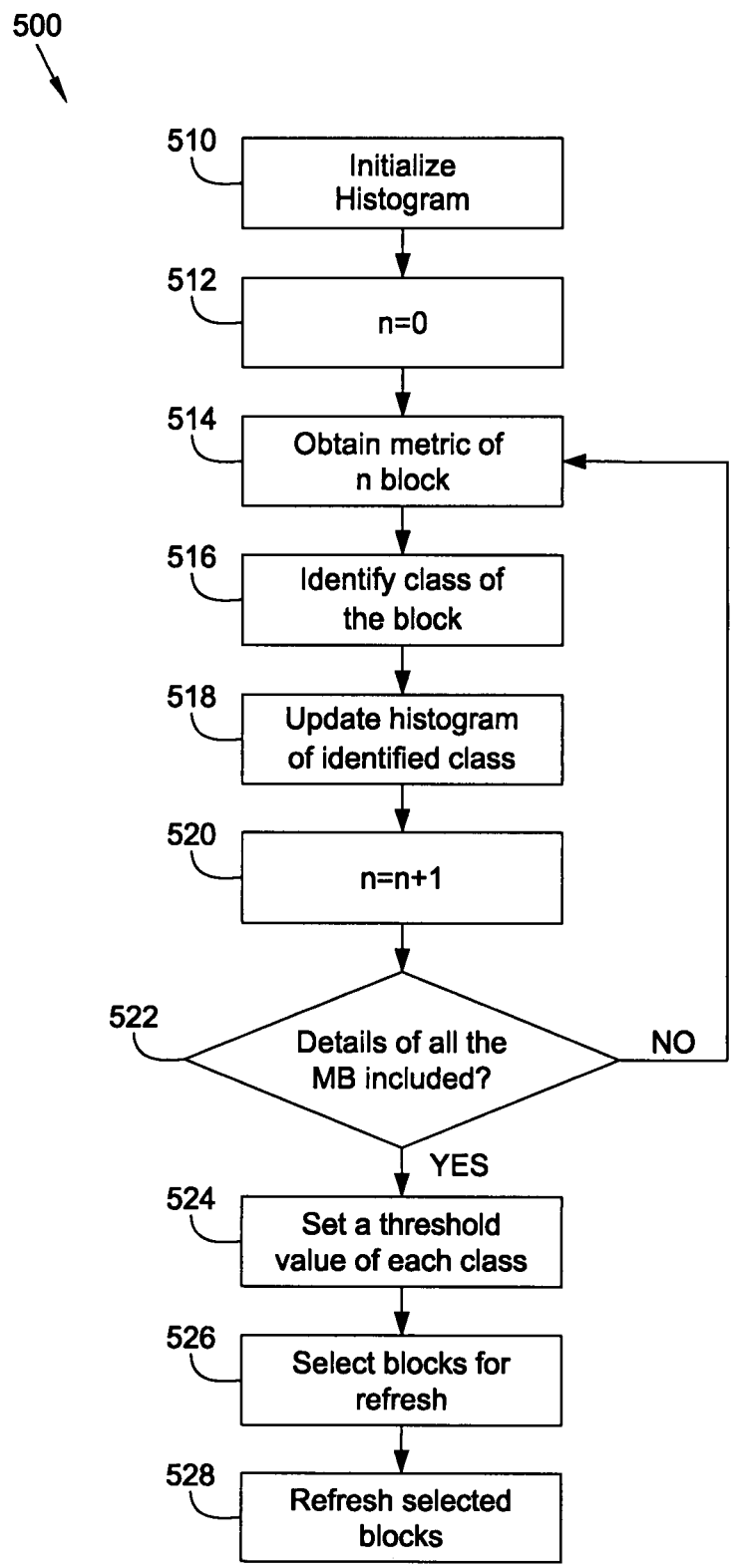
FIG. 5 shows a flow diagram of one of the possible embodiments of a method in accordance with the present subject matter and steps followed therein for refreshing blocks according to histogram.

FIG. 5 shows step of identifying 220 in more details. The flow diagram 500 shows steps for identifying and refreshing MBs according to the histogram. At a step 510 the histogram is initialized for each class (static and/or non-static) of the image frame. At a step 512 a counter 'n' is set to zero. At a step 514 a metric of '$n^{th}$' MB is obtained. At a step 516 class of the '$n^{th}$' MB is identified. At subsequent step 518 a histogram of an identified class is updated to include details of the MB. At a step 520 the counter n is incremented by one. At a step 522 it is checked if details of all the MBs are included in the histogram. If the check result is false then steps 514 are repeated. If the check result is true then in step 524 a threshold value of metric is set for each class. At a step 524 may also be used for setting other conditions for selection of the MBs e.g. setting maximum number of MBs to be refreshed and other conditions discussed earlier. At a step 526 MBs from each class are selected for refresh according to respective threshold values or according to any other conditions set in step 524 and in step 528 the selected MBs are refreshed.

The selection of MBs according to histogram may lead to distribution of refreshed MBs across a frame. However, this may also lead to a refreshed MB to be surrounded by a group of un-refreshed MBs and cause newly refreshed areas to inherit error from the surrounding un-refreshed MBs. Such a situation may be avoided by selecting the MBs for refresh according to their spatial location. According to this selection process a set of spatially adjoining MBs are identified. The set may be identified to ensure that selected MBs put together forms a geometry that has minimum perimeter for a given number of MBs. For example, if 12 MBs are selected then selection may be preferable wherein a 3×4 MBs are selected as compared to a 6×2.

The spatial group of MBs to be refreshed may be chosen based on the values of MB level metrics of the MBs included in the group. To enable this process, group-level metrics are used. The shape of the group is so chosen that the perimeter of the chosen shape is minimal for any geometrical shape of the given number of MBs. This is preferable to minimize error propagation through perimeter. For choosing this group of MBs, all possible groups of MBs with the chosen shape(s) have to be identified and a search for the group with the highest group level metric has to be done.

Figure 6:
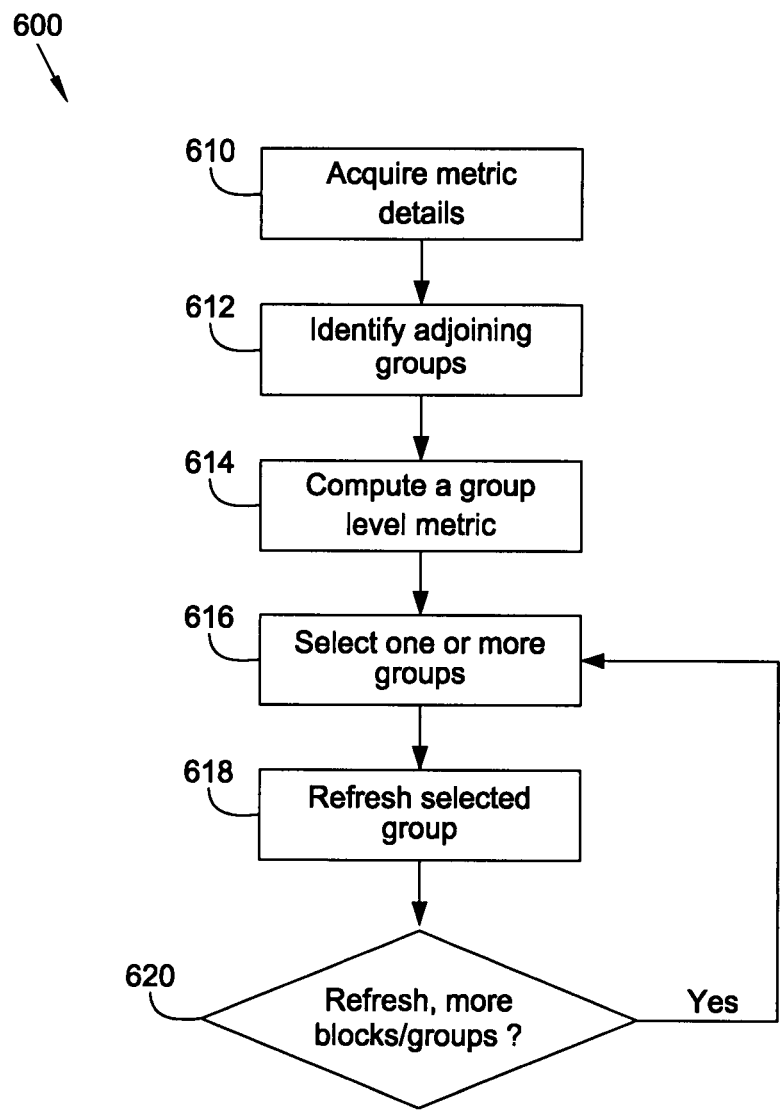
FIG. 6 shows a flow diagram of one of the possible embodiments of a method in accordance with the present subject matter and steps followed therein for refreshing blocks according to spatial location of blocks.

FIG. 6 shows another embodiment 600 of step of identifying MBs 220 for selection for refresh and steps followed therein for refreshing MBs according to spatial location of MBs. At a step 610 the metric details are acquired. According to the spatial map—spatial map being a relation between location of the MB and the value of its metric—at a step 612 groups of spatially adjoining MBs are identified. At a step 614 the group level metric is computed for each of the selected groups. At a step 616 one or more of the groups amongst the group of MBs according to the group level metric are selected. At a step 618 the selected group or groups are refreshed and at step 620 it is checked if more MBs are required to be refreshed, if the cheek provides a result true then steps 618 onwards are repeated. The identifying step terminates if the condition is false.

The method of spatial grouping of refresh MBs helps in controlling error propagation by reducing the perimeter of areas refreshed in a particular image frame. Further reduction of error propagation may happen by spatial-temporal grouping of refresh MBs. According to this method, the MBs to be refreshed in the image frame may be constrained to be spatially adjacent to the MBs which predict from the areas refreshed in the immediately preceding image frames. This process achieves growing of the refreshed areas across image frames. One way of implementing would be by imposing the following constraints while selecting the MBs to be refreshed in the steps the image frame:

The value of the metric of the MB to be refreshed should be greater than a first threshold (Thr_high), The number of spatially adjacent MBs to the MB to be refreshed with their MB level metric less than a second threshold (Thr_low) is greater than an identified number. The identified number may be 3 MBs.

In another possible implementation, a constraint on a function of the values of the metrics of the spatially neighboring MBs may be used. For example the function may implement an average of the values of the metrics of the spatially neighboring MBs.

The threshold Thr_low may be a selected constant, value of Thr_high may depend on the targeted refresh period. The threshold Thr_high may also be derived from a histogram of the MB level metrics. When deriving Thr_high from the histogram, it may be so chosen that a determined (n_high) number of macroblocks with the highest MB level metric value satisfy the condition (a) described above. The said number of macroblocks (n_high) may be the same as the target number of macroblocks to be refreshed in this frame (n_refresh) or a function of the targeted number of macroblocks refreshed in the image frame.

In an embodiment, the threshold Thr_low may be selected as "1", the threshold Thr_high may be derived from the histogram of the MB level metrics and n_high=beta*n_refresh; when preferred values of beta are 1, 1.25, 1.5.

According an aspect of the method either the selection of the MBs may be carried out using histogram, by grouping MBs spatially, by implementing region growing of the refresh MBs or by using a combination of the methods. To choose the MBs to be refreshed in the image frame a list of priority of methods to be used for selecting the refresh MBs may be received and each of the methods in the order of priority may be used to select the refresh MBs. After selecting refresh MBs using a particular method, the number of remaining refresh MBs may be suitably decremented by the number of MBs chosen for refresh using the previous method. At each stage the number of refresh MBs to be selected using that method may be decided through an external optimization step.

According to one aspect of the above method, method of selection of refresh MBs using histogram based refresh may be combined with the method of selection of refresh MBs using spatial grouping. If n_refresh is the number of MBs to be refreshed in an image frame, method of selection of MBs using spatial grouping technique is employed and n_spatial MBs are selected for refresh. The rest of the (n_refresh−n_spatial) refresh MBs are selected using the histogram based mechanism.

According to another aspect of the above method, method of selection of refresh MBs using histogram based refresh may be combined with the method of selection of refresh MBs using spatial grouping and the method of selection of MBs using region growing. If n_fresh is the number of MBs to be refreshed in the image frame, method of selection of MBs using spatial grouping technique is employed and n_spatial MBs are selected for refresh. The method of selection of MBs using region growing may be employed as a second step to choose an addition n_region number of refresh MBs. The rest of the (n_refresh−n_spatial) refresh MBs are selected using the histogram based mechanism.

In any of the above implementations, if at any of the steps the number of MBs chosen for refresh exceeds the set targeted number of refresh MBs (n_refresh), then the steps following the same need not be executed.

Figure 7:
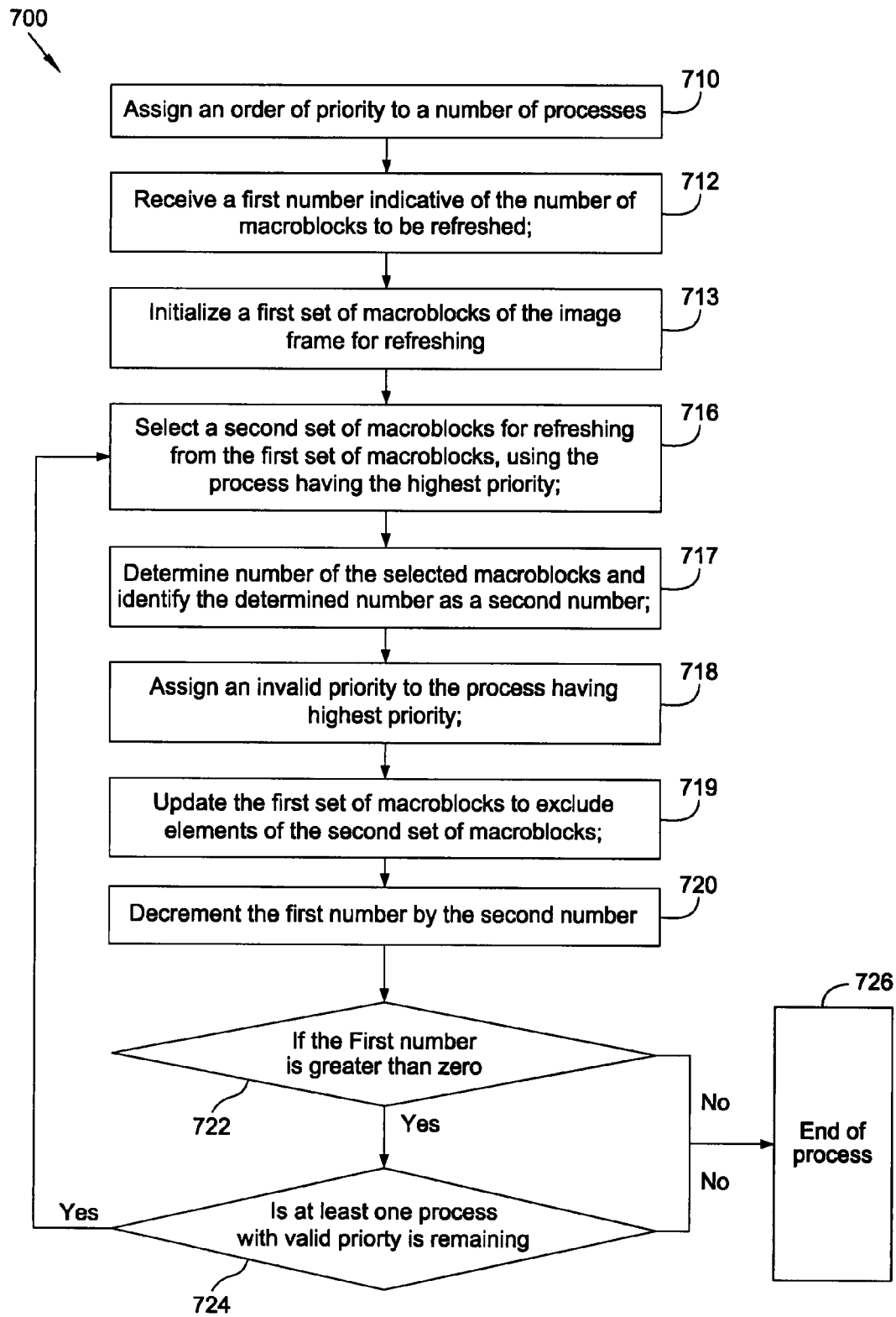
FIG. 7 shows a flow diagram of one of the possible embodiments of a method in accordance with the present subject matter.

FIG. 7 depicts a flow diagram 700 for a method of selection for refreshing a digital video. At a step 710 a number of processes, each of them includes steps for selecting macroblocks, are assigned priority. At a step 712, a first number which may be an indicative of total number of macroblocks that are required to be selected is received. At a step 713 a first set of macroblocks of the image frame is initialized for refreshing. At a step 716 a second set of macroblocks is selected from the first set of macroblocks using the process having highest priority. At a step 717 total number of macroblocks of the second set of macroblocks is determined as a second number. At a step 718 an invalid priority assigned to the process with highest priority. At a step 719 the first set of macroblocks is updated to exclude elements of the second set of macroblocks. At a step 720, the first number is decremented by the second number. At a step 722 it is checked if the first number is still greater than zero. If not, then the process exits 726. If the first number is greater than zero, then, it is checked, at a step 724, if a process with a valid priority exists. If not, then the process exits 726. If yes, then the steps 716 onwards are repeated. The processes that include steps for selecting may be in accordance with the processes discussed earlier for limiting error propagation. The processes may include steps of selecting macroblocks according to a histogram of the macroblock level metric.

The subject matter provides options for selecting amongst inter or intra refresh coding mechanism. A reliable reference image frame is a frame that is certain to be available at the decoding end of the video without significant error propagation. A reliable reference image frame increases coding gain of an encoder that encodes the video and it also increases error resilience of the encoding. According to the concept introduced by this method, the reliable reference image frame is used to decrease the impact of intra refresh on the compression efficiency. In this method, refresh blocks may be coded as inter blocks using the reliable reference image frame.

The method uses an alternate method to refresh block using long term reference image frames (available as a tool in ITU-T H.263++ and H.264 video coding standards), where coding using a reliable long term reference image frame is considered as equivalent to coding it as an intra block. An image frame is called a reliable long term reference image frame, if it has been flagged by the encoder as long term reference and the image frame has been decoded by the decoder without any propagation error. A refresh block is encoded as inter block using reliable long term image frame, if that is found to be more efficient than coding as intra block.

According to one aspect the selection of one of the coding mechanism is done according to a cost function. The cost function would assign a cost to each of the modes of refresh and the assigned cost would be indicative of the compression efficiency of the mode being used. The cost function would be a function of one or more of the following;

Residuals of the signal [i.e. the difference signal formed after subtracting the predictor formed using INTER on INTRA prediction from the source signal]:

Quantizer used to quantize the residual;

Bits to code the residual in the particular mode (Residual_bits):

Bits to code any syntactical elements required by the mode (Syntax_bits):

Indicative realizations of the function are given below:

$$\text{Cost(mode)} = f(\text{residual}) \quad (11)$$

$$\text{Cost(mode)} = f(\text{residual}) + \text{Syntax\_bits} \quad (12)$$

$$\text{Cost(mode)} = f(\text{residual}, \text{quantizer}) + \text{Syntax\_bits} \quad (13)$$

$$\text{Cost(mode)} = f(\text{residual}, \text{quantizer}) + \text{Residual\_bits} + \text{Syntax\_bits} \quad (14)$$

Indicative realization of the function "$f$" used in the relations 11 and 12 may be $f(\text{residual}) = \text{Constant} * \text{Energy of the residual signal}$ Indicative realization of the function "$f$" used in the relations 13 and 14 may be $f(\text{residual}, \text{quantizer}) = [k(\text{quantizer}) * \text{Energy of the noise introduced through Quantization of the MB}]$ With typical realization of the cost function, a higher value of cost would mean a less efficient way of coding. Thus, a mode with the lowest cost would be chosen. But, the method of choosing the mode would depend on the nature of the cost function.

Although the description includes various steps that are arranged serially in the exemplary embodiments, other embodiments of the subject matter may execute two or more steps in parallel, using multiple processors or a single processor organized as two or more virtual machines or sub-processors.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising machine-accessible medium having associated instructions.

Other embodiments will be readily apparent to those of ordinary skill in the art. The elements, algorithms, and sequence of operations can all be varied to suit particular requirements. The methods described-above with respect to the method can be performed in a different order from those shown mid described herein.

FIGS. 1-7 herewith are merely representational and are not drawn to scale. Certain proportions thereof may be exaggerated, while others may be minimized. All the figures illustrate various embodiments of the subject matter that can be understood and appropriately carried out by those of ordinary skill in the art.

In the foregoing detailed description of the embodiments of the subject matter, various features are grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the detailed description of the embodiments of the subject matter, with each claim standing on its own as a separate preferred embodiment.

What is claimed is:

1. A method for tracking error propagation in a digital video encoder that encodes a digital video, the digital video having a plurality of image frames, and each image frame having a plurality of blocks of pixels, wherein a pixel dependency count for a block of pixels is initialized at a first image frame of the digital video, the method comprising the steps of:
resetting the pixel dependency count for the block of pixels if the block of pixels is a part of an intra-coded macroblock in a current frame, wherein the pixel dependency count is indicative of a level of error propagation within the block of pixels;
if the block of pixels is not part of the intra-coded macroblock in the current frame,
computing, using a computing device, the pixel dependency count for the block of pixels in the current frame as a function of pixel dependency counts of one or more blocks of pixels in one or more preceding image frames used for motion compensating the block of pixels in the current frame; and
updating the computed pixel dependency count of the block of pixels in the current frame using an updating function; and
refreshing one or more macroblocks, wherein the macroblock includes one or more blocks of pixels, and wherein refreshing the one or more macroblocks comprises:
obtaining for each macroblock, a macroblock level pixel dependency count as a function of the pixel dependency count of one or more blocks included in the macroblock; and
selecting for refresh one or more macroblocks according to the macroblock level pixel dependency counts of the selected macroblocks to limit error propagation in the macroblocks in following image frames, wherein the one or more macroblocks are selected according to a histogram, the histogram being representative of a relation between a value of the macroblock level pixel dependency count and a number of macroblocks having that value.

2. The method as claimed in claim 1, further comprising:
obtaining for each macroblock a first value of a macroblock level metric from values of a first metric of the blocks included in the macroblock;
obtaining for each macroblock a second value of the macroblock level metric from values of a second metric of the blocks included in the macroblock;
selecting a first set of macroblocks according to the first macroblock level metric; and
selecting a second set of macroblocks from the first set according to the second macroblock level metric.

3. The method as claimed in claim 2, wherein the first metric of a block is an estimate of distortion in the block due to estimated error propagation.

4. The method as claimed in claim 2, wherein the second metric of a block is the pixel dependency count, the pixel dependency count being indicative of a number of frames of dependency of the block in an image frame in the sequence of image frames.

5. The method as claimed in claim 2, wherein the step of selecting the second set of macroblocks is performed according to a threshold on the value of the second macroblock level metric, the threshold value being a function of a chosen refresh period.

6. The method as claimed in claim 1, wherein selecting for refresh the one or more macroblocks further comprises:
identifying one or more spatially adjoining macroblocks for each of the macroblocks selected for refresh; and
further selecting one or more macroblocks for refresh amongst the identified macroblocks according to the macroblock level pixel dependency counts of the spatially adjoining macroblocks.

7. The method as claimed in claim 1, wherein the updating function is configured for selecting a value of the pixel dependency count for the block of pixels and incrementing the value of the pixel dependency count for the block of pixels.

8. The method as claimed in claim 1, further comprising a step of refreshing the selected macroblocks, the step of refreshing the selected macroblocks is performed by encoding each of the selected macroblocks as an intra-coded macroblock.

9. The method as claimed in claim 1, further comprising a step of refreshing each of the selected macroblocks, the step of refreshing each of the selected macroblocks includes a step of selecting one of inter-coding the macroblock by motion compensating using a reliable reference frame or intra-coding the macroblock according to a cost function, the cost function being a function of one or more of: bits to code in a particular coding mode, a residual signal to be coded in the particular coding mode, and a quantization step size.

10. The method as claimed in claim 1, wherein the step of selecting for refresh one or more macroblocks is performed according to a threshold on the macroblock level pixel dependency count, the threshold being a function of a chosen refresh period.

11. The method as claimed in claim 10, wherein the chosen refresh period is a period of time over which the error propagation at a decoding end is reduced to an identified level starting from a time of occurrence of an error, wherein no other errors are added during the period.

12. A method for tracking error propagation in a digital video encoder that encodes a digital video, the digital video having a plurality of image frames, and each image frame having a plurality, of blocks of pixels, wherein a pixel dependency count for a block of pixels is initialized at a first image frame of the digital video, the method comprising the steps of:
resetting the pixel dependency count for the block of pixels if the block of pixels is a part of an intra-coded macroblock in a current frame, wherein the pixel dependency count is indicative of a level of error propagation within the block of pixels; and
if the block of pixels is not part of the intra-coded macroblock in the current frame,
computing, using a computing device, the pixel dependency count for the block of pixels in the current frame as a function of pixel dependency counts of one or more blocks of pixels in one or more preceding image frames used for motion compensating the block of pixels in the current frame; and
updating the computed pixel dependency count of the block of pixels in the current frame using an updating function, wherein the pixel dependency count for the block of pixels is updated using the equation:

$$PDC(x,y,n)=1+\max\{PDC(xi,yi,ref)|\forall(xi,yi)\in S(x,y)\}$$

wherein PDC refers to the pixel dependency count, (x, y) refers to co-ordinates in an image frame "n", S(x, y) refers to a set of pixels in a reference image frame (ref) used for motion compensated prediction of a pixel p(x, y, n), and PDC (xi, yi, ref) refers to the pixel dependency count at a position having co-ordinates (xi, yi) in the ref.

13. The method as claimed in claim 12, further comprising a step of refreshing one or more macroblocks, wherein the macroblock includes one or more blocks of pixels, and the step of refreshing one or more macroblocks comprises:
obtaining for each macroblock, a macroblock level pixel dependency count as a function of the pixel dependency count of one or more blocks included in the macroblock; and selecting for refresh one or more macroblocks according to the macroblock level pixel dependency counts of the selected macroblocks to limit error propagation in the macroblocks in following image frames.

14. The method as claimed in claim 13, further comprising a step of refreshing the selected macroblocks, the step of refreshing the selected macroblocks is performed by encoding each of the selected macroblocks as an inter-coded macroblock that is motion compensated using a reliable reference frame, wherein the reliable reference frame is a reference image frame that is known to have been received without errors at a decoding end.

15. The method as claimed in claim 13, further comprising a step of refreshing the selected macroblocks, the step of refreshing the selected macroblocks is performed by encoding each of the selected macroblocks as an intra-coded macroblock.

16. The method as claimed in claim 13, further comprising a step of refreshing each of the selected macroblocks, the step of refreshing each of the selected macroblocks includes the step of selecting one of inter-coding the macroblock by motion compensating using a reliable reference frame or intra-coding the macroblock according to a cost function, the cost function being a function of one or more of, bits to code in a particular coding mode, a residual signal to be coded in that particular coding mode, and a quantization step size.

17. The method as claimed in claim 13, wherein the step of selecting for refresh one or more macroblocks is performed according to a threshold on the macroblock level pixel dependency count, the threshold being a function of a chosen refresh period.

18. The method as claimed in claim 17, wherein the chosen refresh period is a period of time over which the error propagation at a decoding end is reduced to an identified level starting from a time of occurrence of an error, wherein no other errors are added during the period.

19. The method as claimed in claim 13, wherein selecting for refresh the one or more macroblocks further comprises:
 identifying one or more spatially adjoining macroblocks for each of the macroblocks selected for refresh; and
 further selecting one or more macroblocks for refresh amongst the identified macroblocks according to the macroblock level pixel dependency counts of the spatially adjoining macroblocks.

20. The method as claimed in claim 12, wherein the updating function is configured for selecting a value of the pixel dependency count for the block of pixels and incrementing the value of the pixel dependency count for the block of pixels.

21. A method for tracking error propagation in a digital video encoder that encodes a digital video, the digital video having a plurality of image frames, and each image frame having a plurality of blocks of pixels, wherein a pixel dependency count for a block of pixels is initialized at a first image frame of the digital video, the method comprising the steps of:
 resetting the pixel dependency count for the block of pixels if the block of pixels is a part of an intra-coded macroblock in a current frame, wherein the pixel dependency count is indicative of a level of error propagation within the block of pixels;
 if the block of pixels is not part of the intra-coded macroblock in the current frame,
  computing, using a computing device, the pixel dependency count for the block of pixels in the current frame as a function of pixel dependency counts of one or more blocks of pixels in one or more preceding image frames used for motion compensating the block of pixels in the current frame; and
  updating the computed pixel dependency count of the block of pixels in the current frame using an updating function; and
 refreshing one or more macroblocks, wherein the macroblock includes one or more blocks of pixels, and wherein refreshing the one or more macroblocks comprises:
  obtaining for each macroblock, a macroblock level pixel dependency count as a function of the pixel dependency count of one or more blocks included in the macroblock; and
 selecting for refresh one or more macroblocks according to the macroblock level pixel dependency counts of the selected macroblocks to limit error propagation in the macroblocks in following image frames, wherein the one or more macroblocks are selected according to a histogram, the histogram being representative of a relation between a value of the macroblock level pixel dependency count and a number of macroblocks having that value; and refreshing the selected macroblocks, the step of refreshing the selected macroblocks is performed by encoding each of the selected macroblocks as an inter-coded macroblock that is motion compensated using a reliable reference frame, wherein the reliable reference frame is a reference image frame that is known to have been received without errors at a decoding end.

* * * * *